United States Patent [19]

Koski

[11] 3,820,375

[45] June 28, 1974

[54] HYDRAULICALLY OPERATED TUBE FLARING TOOL

[75] Inventor: Jerry V. Koski, Parma, Ohio

[73] Assignee: Parker-Hannifin Corporation, Cleveland, Ohio

[22] Filed: Aug. 31, 1972

[21] Appl. No.: 285,421

[52] U.S. Cl. ............................................ 72/318
[51] Int. Cl. ...................................... B21d 41/02
[58] Field of Search ............ 72/293, 296, 297, 312, 72/316, 318

[56] References Cited
UNITED STATES PATENTS

| | | | |
|---|---|---|---|
| 1,935,714 | 11/1933 | Hummell | 72/316 |
| 2,438,999 | 4/1948 | Hartley et al. | 72/316 |
| 2,464,510 | 3/1949 | Hull | 72/312 |
| 2,465,677 | 3/1949 | Deverall | 72/316 |
| 2,480,762 | 8/1949 | Parker | 72/312 |
| 2,993,522 | 7/1961 | Temple | 72/318 |
| 3,031,007 | 4/1962 | Temple | 72/318 |
| 3,192,758 | 7/1965 | Catlin et al. | 72/316 |
| 3,338,082 | 8/1967 | Steele | 72/306 |
| 3,411,338 | 11/1968 | Carlin | 72/316 |
| 3,412,592 | 11/1968 | Ramsay | 72/316 |

Primary Examiner—Charles W. Lanham
Assistant Examiner—M. J. Keenan
Attorney, Agent, or Firm—John N. Wolfram

[57] ABSTRACT

A hydraulically operated tube flaring tool having a housing with a side opening through which the tube and a portion of the collet for gripping the same can be moved in a sidewise direction for easy loading and unloading of the tool. The tool also has two hydraulically operated pistons, one for clamping the collet on the tube and the other for flaring the tube. The pistons are retracted by a tension spring. An arm is swingable transversely of the tool for locating the tube axially and is spring pressed to an out of the way position during the flaring operation.

8 Claims, 3 Drawing Figures

PATENTED JUN 28 1974 3,820,375
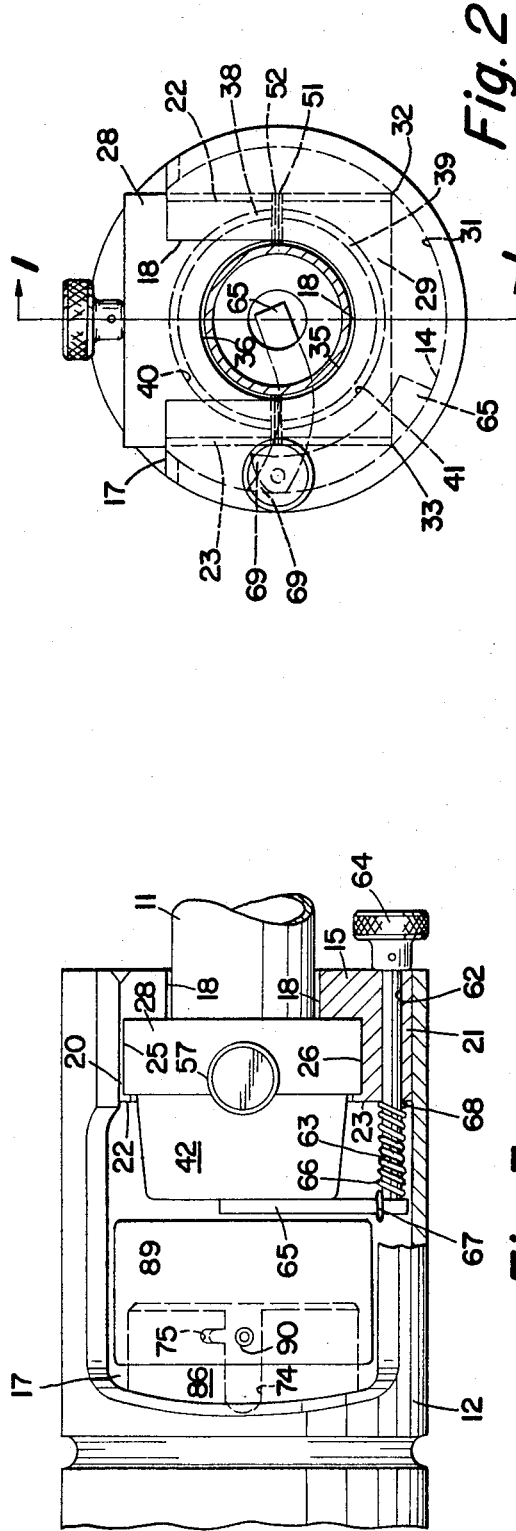
Fig. 2
Fig. 3
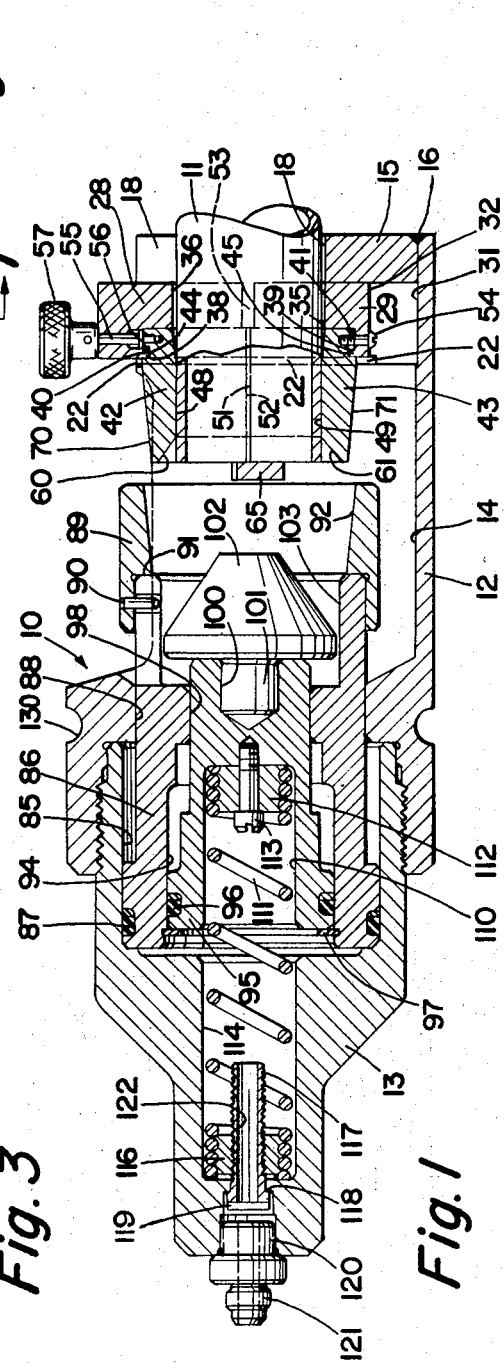
Fig. 1

HYDRAULICALLY OPERATED TUBE FLARING TOOL

BACKGROUND OF THE INVENTION

Heretofore hydraulically operated tube flaring tools have been complicated and bulky. In particular, the operator has been required to perform several steps in loading and unloading of the tube. Also, the hydraulic motor arrangements for clamping the tube and for flaring the same have been cumbersome. For example, the U.S. letters Pat. No. of Hartley et al., 2,438,999 provides two cylinder chambers with oppositely actuated pistons therein for performing the clamping and flaring operations.

Temple et al., U.S. letters Pat. No. 2,993,522 is not hydraulically operated but is a fluid pressure operated device in that it utilizes expanding gas from an explosive charge for moving clamping and flaring pistons. The arrangement shown is cumbersome and time consuming in that after the flaring operation it is necessary to reach into the tool with a threaded rod to retract the pistons. Also, the tube clamping arrangement requires that the entire collet be removed during loading and unloading of the tube.

SUMMARY OF THE INVENTION

The present invention is an improvement on prior devices in that the tube may be loaded and unloaded by sidewise movement through a side opening in the housing and without removing all of the collet parts. The fluid motor includes telescoping pistons, one for clamping the tube and the other for flaring the tube, and both pistons are automatically retracted by a tension spring when fluid pressure is released.

BRIEF DESCRIPTION OF DRAWING

FIG. 1 is a vertical longitudinal cross section of the tool.

FIG. 2 is an end view from the end where the tube is clamped.

FIG. 3 is a partial plan view of the tube loading end of the tool.

DETAILED DESCRIPTION

The tool, generally designated 10, is used for flaring a tube and includes threaded together housing members 12 and 13. Housing member 12 has a cylindrical chamber 14 therein that is partially closed at its outer end by a cap 15 welded to housing 12 at 16 and has a side opening 17. Cap 15 has a U shaped opening 18 therethrough that is large enough to accommodate the largest diameter tube 11 to be flared.

Cap 15 has inward extensions 20, 21 on opposite sides terminating in inwardly turned ribs 22, 23 that extend in a vertical direction to form a pair of recesses or keyways 25, 26.

Slidably mounted in keyways 25, 26 are an upper collet support member 28 and a lower collet support member 29. The latter is held in its vertical position by bottoming at a counterbored wall 31 of housing member 12 where designated at 32, 33. The upper portion of lower support member 29 has a semicircular opening 35 therethrough and the lower portion of upper support member 28 has a semicircular opening 36 therethrough. These openings 35, 36 are slightly larger in radius than the radius of the largest tube to be accommodated by the tool.

At their inner ends, support members 28, 29 have semicircular ribs 38, 39 that form recesses 40, 41. Received in these recesses are upper and lower semicircular collet pieces 42, 43, each of the collet pieces having a semicircular recess 44, 45 to receive ribs 38, 39 so that the collet pieces cannot move axially relative to support members 28, 29. The collet pieces likewise have semicircular openings 48, 49 therethrough of approximately the same diameter as the tube to be clamped thereby. When tightly clamped, the adjoining die faces 51 and 52 meet. Sizing the die halves to meet when clamped permits control of tube distortion in the clamping area regardless of pressure. Cut back of the faces is designed to provide efficient clamping of a range of under and over- size tubes without excessive distortion. Gap 53 between support members 28, 29 is larger than the initial gap between faces 51 and 52 to avoid interference with the clamping of the collet pieces. A separate set of collet pieces 42, 43 are required for each OD tube size to be accommodated by the tool but it is not necessary to have additional support members 28, 29.

Lower collet member 43 may be attached to lower support member 29 only by the rib and groove connection 39, 45, or by a screw 54.

Upper collet piece 42 is attached to upper support member 28 by a pin 55 threaded into collet piece 42 and having a flange 56 for retaining pin 55 on upper support member 28 when the latter is detached from collet piece 42. A handle 57 is attached to pin 55 for threading the pin into collet piece 42.

The inner ends of collet pieces 42, 43 are chamfered as at 60, 61 to receive the flare to be formed upon tube 11.

Cap 15 has a bore 62 therethrough for receiving a shaft 63 having a nob 64 attached thereto at its outer end and having an arm 65 rigidly attached to its inner end. A torsion spring 66 has a hook 67 around arm 65 and a tang 68 which lies against the inner wall of cylindrical chamber 14 to normally hold arm 65 rotated to an out of the way position against the inner wall of chamber 14, as shown in FIG. 2. However, the arm may be rotated into another position for serving as a stop for tube 11, also shown in FIG. 2. Arm 65 has an angular end 69 which stops rotation so as to center the opposite end of the arm to align with the centerline of the tube 11.

The outer faces 70, 71 of collet pieces 42, 43 are tapered as shown so as together describe a frustrum of a cone.

Housing member 13 has an internal cylindrical surface 85 slidably receiving a clamping piston 86 sealed by packing 87. A portion of piston 86 extends through bore 88 of housing member 12. Piston 86 has an access slot 74 and a keyway 75 off of the slot. Cam ring 89 has a roll pin 90 extending therefrom to be inserted into the slot and rotated into the keyway. Thus the cam ring is removably attached to piston 86 by a bayonet connection. Ring 89 has an abutting relationship with piston 86 at 91 and has an internal conical surface 92 to fit over collet surfaces 70, 71 for contracting collet pieces 42, 43 into tight gripping engagement with tube 11.

Clamping piston 86 has an internal cylindrical bore 94 that receives a piston 95 sealed therein by a packing 96 and retained by a snap ring 97.

A portion of piston 95 extends through a reduced bore 98 in piston 86 and has a recess 100 that receives a pin 101 on a flaring cone 102 that is received within a counterbore 103 in piston 86.

Piston 95 has a bore 110 for receiving a spring 111 that has threaded thereinto a bushing 112 that is rigidly attached to piston 95 by a bolt 113.

The other end of spring 111 extends into a recess 114 of housing member 13 and is threaded to a bushing 116 which in turn is threaded onto a hollow stud 117 and which has abutting engagement with housing 13 at 118. Stud 117 may be rotated by means of a tool inserted in slots 119 for adjusting the axial position of bushing 116 therealong and hence changing the minimum length of spring 111 so as to adjust the tension thereof as desired.

Body 13 has a threaded port 120 receiving a tube fitting 121 through which hydraulic fluid may be admitted to and exhausted from the interior of housing member 13 via a bore 122 through stud 117.

OPERATION

To flare a tube 11 of a selected outside diameter, correspondingly sized collet pieces 42, 43 are first assembled to support members 28, 29 while the latter are removed from the tool and as previously described. Support member 29 with collet piece 43 attached thereto is then inserted into keyways 25, 26 to their position as shown in FIG. 1. Tube 11 is then inserted either axially or sidewise into circular recess 49 of collet piece 43 and support member 28 with collet piece 42 attached thereto is then inserted into keyways 25, 26 until collet piece 42 rests against tube 11. Nob 57 serves as a convenient handle for handling support member 28. Nob 64 is then turned to rotate arm 65 into its upward position shown in FIG. 2 and tube 11 is moved thereagainst. Nob 64 is then released so that spring 66 rotates arm 65 to the lower position shown in FIG. 2 where it will be out of the way of the flaring operation. During this time, collet piece 42 will remain against tube 11 by gravity.

Hydraulic fluid from a pump (not shown) is now introduced through fitting 121 into housing 13 and acts upon both of the pistons 86, 95 to move them toward tube 11 and against the force of spring 111. This causes cam ring 89 to move over collet pieces 42, 43 and surface 92 engages surfaces 70, 71 to contract the collet pieces into tight gripping engagement with tube 11. This movement of piston 86 continues until the axial component of the force for contracting collet pieces 42, 43 equals the force applied to piston 86 by the hydraulic fluid within housing 13. At this time, piston 95 will continue to advance or extend by reason of the hydraulic fluid acting thereon and moves away from snap ring 97 and causes flaring cone 102 to engage and flare the end of tube 11.

The effective pressure areas of the pistons 86, 95 are proportional so that the clamping force applied by piston 86 through the cam ring 89 and collet pieces 42, 43 to the tube will always be much greater than the force applied by piston 95 in accomplishing the flare, thereby preventing slippage of the tube during the flaring operation.

Upon completion of the flaring operation, the operator adjusts the hydraulic system to reduce the hydraulic pressure on both pistons 86 and 95. Tension spring 111 then overcomes the reduced pressure to retract piston 95 into engagement with snap ring 97 and then pulls both pistons back to their fully retracted positions as shown in FIG. 1. This pulls cam ring 89 back from collet pieces 42, 43 to the position shown in FIG. 1 where cam ring 89 has an axial clearance with collet pieces 42, 43 and tube 11. The flared tube may then be unloaded by lifting out support member 28 and collet piece 42 by means of nob 57. The flared tube may then be removed by moving it upward out of collet piece 43 and support member 29 as well as through openings 17 and 18 in housing member 12 and cap 15. The tool is then ready for another flaring operation. If desired, a U bolt may be inserted into groove 130 for clamping the tool to any suitable supporting structure.

I claim:

1. A tube flaring tool comprising a housing having a flaring chamber with end and side openings; a collapsible collet mounted in said chamber and fixed against axial movement relative thereto for receiving a tube extending through said end opening, means for clamping said collet against the tube, means for flaring the tube, said clamping means and said flaring means being supported for longitudinal movement in the same direction in said housing from a first position axially inwardly spaced from said collet and from the tube end to a second position whereat said clamping means is in weged clamping engagement with said collet pieces, and said flaring means is in flaring engagement within the end of the clamped tube, and said collet and the tube being insertable into said chamber and withdrawable therefrom when said clamping means and said flaring means is in said first position.

2. The tool of claim 1 wherein said collet includes an outer collet piece positioned adjacent said side opening and an inner collet piece positioned behind said outer collet piece remote from said side opening, whereby a tube and said outer collet piece are insertable into said chamber and withdrawable therefrom while said inner collet piece remains in said chamber.

3. The tool of claim 1 wherein said housing has a slideway extending substantially parallel to said side opening, said collet being insertable into said chamber and withdrawable therefrom by sliding on said slideway.

4. The tool of claim 1 wherein a spring between said housing and said flaring means is operative to move the latter from said second position to said first position; and wherein said flaring means and said clamping means have interengageable surfaces for movement of the latter from said second position to said first position by force thereon exerted by said spring on said flaring means.

5. A tube flaring tool comprising a housing having a flaring chamber, a collapsible collet mounted in said chamber for gripping a tube received therein and having end portions which taper radially and axially inward, clamping means including a cam ring movable longitudinally of said housing into wedged clamping engagement with said collet end portions for collapsing said collet into gripping engagement with a tube received therein, and flaring means movable longitudinally of said housing in the same direction as said cam ring for flaring the end of a tube gripped by said collet.

6. A tube flaring tool comprising a housing having tube gripping means including a radially contractable collet fixed against axial movement relative to said housing, and having a fluid pressure operated motor including coaxial flaring and clamping pistons respectively having a flaring head engageable with a tube gripped in said collet to flare the same, and a cam ring engageable with said collet to grip a tube therewithin; said motor having port means through which fluid under pressure may be introduced for extending said pistons in the same direction for radially contracting said collet upon a tube therewithin and for flaring the tube gripped in said collet and through which port means fluid under pressure may be released to permit retraction of said pistons whereby the flared tube may be removed from said collet; and spring means acting on said pistons for retracting the same when fluid under pressure is released from said motor through said port means.

7. The tool of claim 6 wherein said spring means comprises a tension spring acting on said flaring piston for retracting the same; and wherein said pistons have interengageable surfaces whereby said tension spring acting through said flaring piston is operative to retract said clamping piston when fluid under pressure is released from said motor through said port means.

8. The tool of claim 7 wherein said pistons have a lost motion connection therebetween for continued movement of said flaring piston and accompanying separation of said interengageable surfaces after said clamping piston has radially contracted said collet to grip a tube therewithin whereby said flaring piston is effective to flare the gripped tube during such continued movement of said flaring piston.

* * * * *